(12) United States Patent
Ong

(10) Patent No.: US 8,096,695 B2
(45) Date of Patent: Jan. 17, 2012

(54) LIGHT GUIDE FOR AMBIENT LIGHT SENSOR IN A PORTABLE ELECTRONIC DEVICE

(75) Inventor: Chi Boon Ong, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 347 days.

(21) Appl. No.: 12/463,373

(22) Filed: May 8, 2009

(65) Prior Publication Data

US 2010/0283394 A1 Nov. 11, 2010

(51) Int. Cl.
*F21V 7/04* (2006.01)

(52) U.S. Cl. ........ 362/616; 362/97.2; 362/253; 362/615

(58) Field of Classification Search ........ 362/97.1–97.2, 362/253, 276, 615–616, 628–629; 385/43, 385/39; 250/227.11
See application file for complete search history.

(56) References Cited

U.S. PATENT DOCUMENTS

| 7,352,930 B2 | 4/2008 | Lowles |
| 7,482,574 B2 | 1/2009 | Wang |
| 2008/0135726 A1 | 6/2008 | Balzer et al. |

FOREIGN PATENT DOCUMENTS

EP 1 748 307 A1 1/2007

OTHER PUBLICATIONS

Miniature Ambient Light Photo Sensor with Digital (I2C) Output, Data Sheet, Avago Technologies, 2008.
Light Guiding Construction. CN201152901, Mingbing Tang et al., ZTE Corp., CN 20072173034U.

*Primary Examiner* — Stephen F Husar
*Assistant Examiner* — Meghan Dunwiddie

(57) ABSTRACT

Disclosed are various embodiments of a light guide and corresponding ambient light sensor, computing device and backlit display for use in a portable electronic device. The various embodiments of the light guide are configured to permit ambient light to be collected efficiently and accurately over wide angles of incidence, even under low-ambient-light conditions. The efficient and accurate collection of ambient light by the various embodiments of the light guide disclosed herein may be employed to more accurately control the amount and degree of backlighting provided to a backlit display, which in turn can be used to conserve valuable battery power in a portable electronic device.

33 Claims, 6 Drawing Sheets

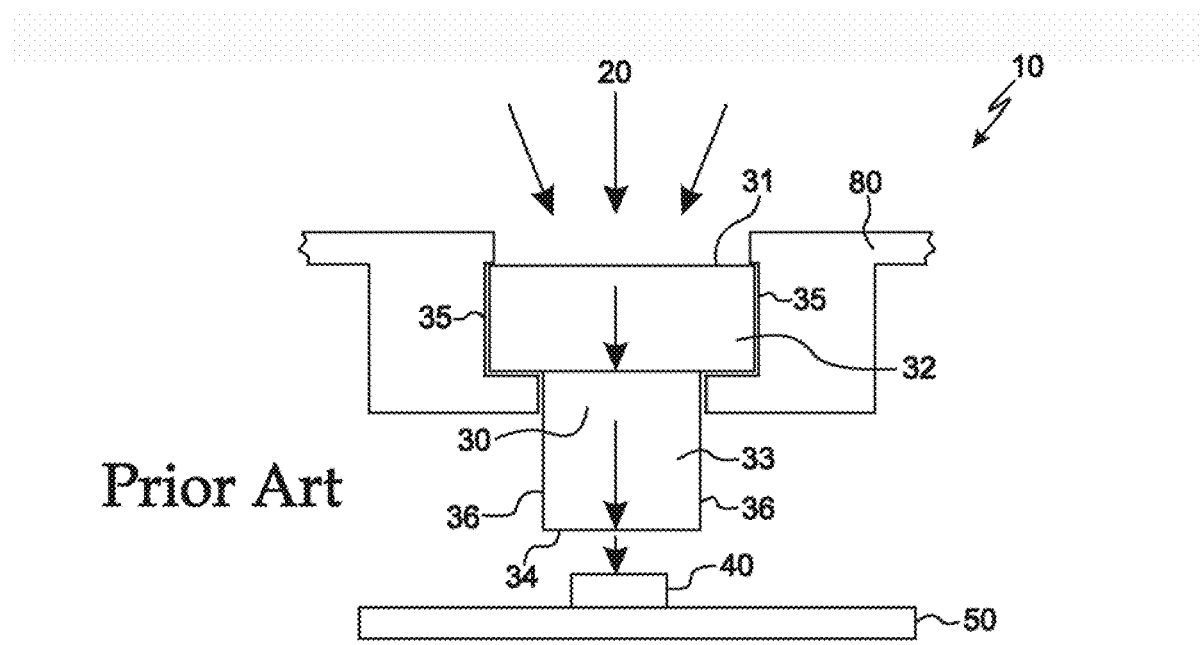
FIG. 3
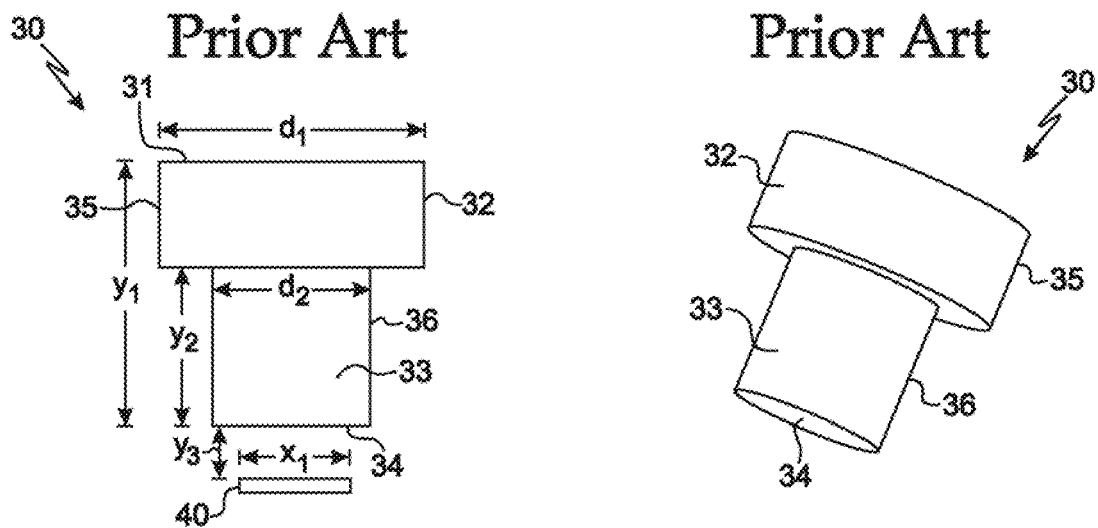
FIG. 4
FIG. 5

Design 3

LIGHT GUIDE FOR AMBIENT LIGHT SENSOR IN A PORTABLE ELECTRONIC DEVICE

FIELD OF THE INVENTION

Various embodiments of the inventions described herein relate to the field of portable electronic devices, systems and methods associated therewith.

BACKGROUND

Ambient light sensors are widely utilized in portable electronic devices such as mobile phones, personal data assistants ("PDAs") and portable computers to sense the intensity of the ambient natural light. Because portable electronic devices are often battery-powered, minimizing power consumption and thereby maximizing device operating time on a single battery charge is an important issue. By sensing the intensity of ambient natural light in the environment where a portable electronic device is being used, information concerning the intensity of ambient natural light can be used to control the amount or degree of backlighting that is provided to a backlit display in the portable electronic device. For example, if the ambient light intensity is high, increased backlighting may be required for a user to view the display. If the ambient light intensity is low, decreased or no backlighting may be required for a user to view the display. Thus, accurately and reliably sensing the intensity of ambient light in portable electronic devices has assumed ever-increasing importance in the bid to prolong portable electronic device single-battery-charge operating times.

Examples of some prior art ambient light sensors include the AVAGO TECHNOLOGIES™ APDS-9002 Miniature Surface Mount Ambient light Photo Diode, the APDS-9003 Miniature Surface Mount Ambient light Photo Diode, the APDS-9004 Miniature Surface Mount Ambient light Photo Diode, the APDS-9005 Miniature Surface Mount Ambient light Photo Diode, the APDS-9006 Miniature Surface Mount Ambient light Photo Diode, the APDS-9007 Ambient Light Photo Sensor with Logarithmic Current, the APDS-9008 Miniature Surface Mount Ambient light Photo Diode, and the APDS-9300 Miniature Ambient Light Photo Sensor with Digital ($I^2C$) Output. A high performance light sensor manufactured by AVAGO TECHNOLOGIES™ is the APDS-9300 sensor, which converts sensed light intensity to a digital signal output capable of direct 12C interface. Each device consists of one broadband photodiode (visible plus infrared) and one infrared photodiode. Two integrating ADCs convert the photodiode currents to a digital output that represents the irradiance measured on each channel. This digital out-put can be input to a microprocessor where illuminance (ambient light level) in lux is derived using an empirical formula to approximate the human-eye response. See, for example, a Data sheet describing the AVAGO TECHNOLOGIES™ APDS-9300 Miniature Ambient Light Photo Sensor with Digital ($I^2C$) Output, hereby incorporated by reference herein in its entirety.

Unfortunately, reliable, accurate and low-cost sensing of ambient light intensity in portable electronic devices remains an elusive goal. What is needed are improved devices, systems and methods for sensing the intensity of ambient light, even in falling light or low-ambient-light conditions, in portable electronic devices that can nevertheless be manufactured and implemented at low cost.

SUMMARY

In some embodiments, there is provided a light guide for a portable electronic device comprising first top and second bottom portions formed of an optically transmissive material, the first top portion comprising a substantially planar horizontal top surface and having a first outer diameter defining first substantially vertical sidewalls, the second bottom portion being contiguous with and attached to the first portion such that at least some ambient light incident on the top surface is transmitted through the first top portion into the second bottom portion, the second bottom portion having second upper and third lower outer diameters that are less than the first outer diameter, the second upper outer diameter defining second substantially vertical sidewalls depending downwardly from the first portion, the third lower outer diameter defining third sloping sidewalls that decrease in diameter downwardly between the second upper outer diameter and a lowermost minimum diameter, the sloping sidewalls having an angle with respect to vertical sufficient to cause total internal reflection of ambient light transmitted through the first portion, reflected from the first sidewalls, and that subsequently becomes incident on the third sloping sidewalls.

In other embodiments, there is provided a portable electronic device comprising a light guide comprising first top and second bottom portions formed of an optically transmissive material, the first top portion comprising a substantially planar horizontal top surface and having a first outer diameter defining first substantially vertical sidewalls, the second bottom portion being contiguous with and attached to the first portion such that at least some vertically-oriented ambient light incident on the top surface is transmitted through the first top portion into the second bottom portion, the second bottom portion having second upper and third lower outer diameters that are less than the first outer diameter, the second upper outer diameter defining second substantially vertical sidewalls depending downwardly from the first portion, the third lower outer diameter defining third sloping sidewalls that decrease in diameter downwardly between the second upper outer diameter and a lowermost minimum diameter, the sloping sidewalls having an angle with respect to vertical sufficient to cause total internal reflection of ambient light transmitted through the first portion, reflected from the first sidewalls, and that subsequently becomes incident on the third sloping sidewalls, an ambient light sensor operably associated with the light guide and disposed therebeneath, the ambient light sensor being configured to receive the ambient light collimated by and transmitted through the light guide, the ambient light sensor further being configured to generate an output signal representative of an intensity of the ambient light that is sensed thereby, a backlit display, and a computing device configured to receive the output signal and determine whether backlighting for the backlit display should be increased or decreased based on the sensed intensity of the ambient light, the computing device being operably associated with the backlit display.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIG. 3 shows a cross-sectional view of a representative light guide of the prior art;

FIG. 4 illustrates representative dimensions of the prior art light guide of FIG. 3;

FIG. 5 shows a bottom perspective view of the prior art light guide of FIGS. 3 and 4;

The drawings are not necessarily to scale. Like numbers refer to like parts or steps throughout the drawings, unless otherwise noted.

DETAILED DESCRIPTIONS OF SOME PREFERRED EMBODIMENTS

A light guide for a portable electronic device is an optically transmissive component configured to capture and direct ambient natural light from the outside of the portable electronic device to an ambient light sensor mounted inside the portable electronic device, typically on an internal printed circuit board. The light guide serves as a bridge between the ambient external environment and the light sensor. Most light guides for use in portable electronic devices are formed of transparent acrylic or a polycarbonate material.

Figure 1:
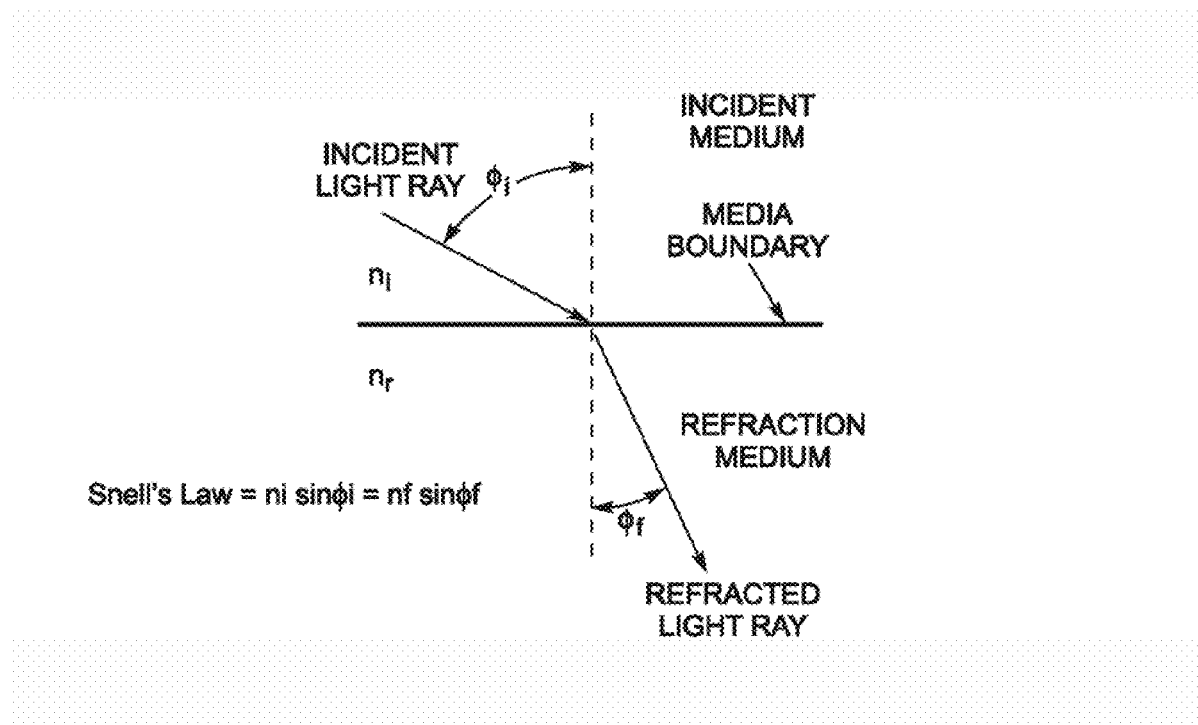
FIG. 1 illustrates the basic principles of Snell's Law.

Referring now to FIG. 1, there are illustrated the basic principles behind Snell's Law, which is:

$$n_i \sin \phi_i = n_f \sin \phi_f \quad \text{(eq. 1)}$$

where $n_i$=the index of refection of the overlying incidence medium, $n_f$=the index of refection of the underlying refraction medium, $\sin \phi_i$=the sine of the angle of incidence in the incident medium, and $\sin \phi_f$=the sine of the angle of incidence in the refraction medium. When light rays are incident on a boundary between two different media having different indices of optical refraction such as a boundary between plastic and air, the light rays are refracted at the boundary in the manner illustrated in FIG. 1. The angle at which the light rays are incident to the boundary is called the angle of incidence, $\phi_i$ and the angle at which the light rays depart the boundary is called the angle of refraction, $\phi_f$. Snell's law (see eq. (1) above) states that the index of refraction of the first medium $(n_i)$ multiplied by the sine of the angle of incidence at the boundary $(\phi_i)$ is equal to the index of refraction of the second medium $(n_r)$ multiplied by the sine of the angle of refraction at the boundary $(\phi_f)$.

Figure 2:
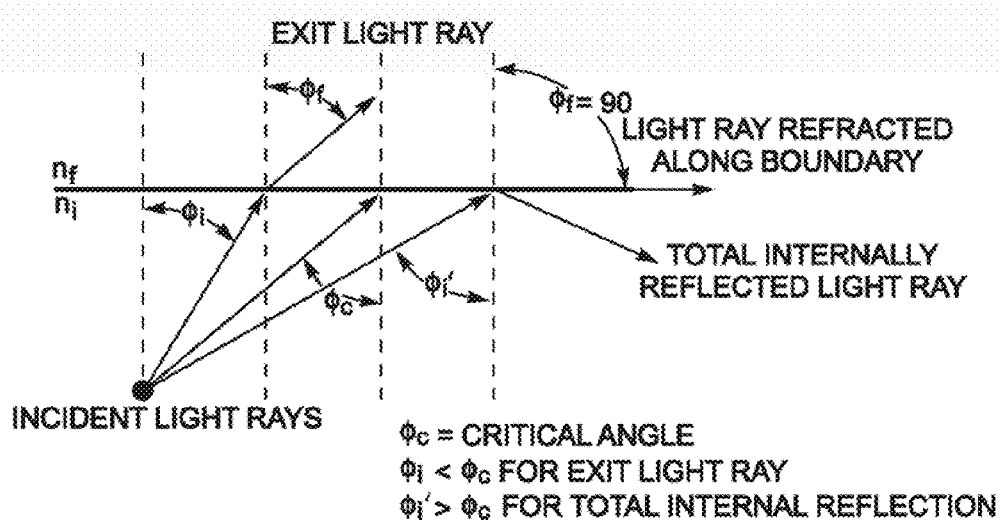
FIG. 2 illustrates the basic principles of total internal reflection ("TIR")

It will be seen that when the angle of refraction $\phi_f$ is 90° the incident light ray is refracted along the boundary, as shown in FIG. 2. The sin of 90°=1.0, and Eq. 1 for Snell's law reduces to: $n_i \sin \phi_i = n_f$. This expression can be rewritten to define the critical incident angle for total internal reflection, $\phi_c$, which is determined by:

$$\sin \phi_c = n_f / n_i \quad \text{(eq. 2)}$$

Setting $n_f$=1.0 in Eq. 2 (the index of refraction value for air), the critical angle for a light guide can be determined when the material index of refraction is known. For most plastics and glass, the index of refraction is approximately 1.50. For ray tracing computational and modelling purposes, an index of refraction of 1.58 for a typical polycarbonate material was selected. The resulting computed critical angle is for total internal reflection in a representative polycarbonate material was therefore about 39°. Internal specular reflection within a light guide at the guide surface to air boundary may also be utilized to help transmit light efficiently through the light guide. Thus, light rays internal to a light guide but incident on an internal light guide surface to air boundary are total internally reflected when the angle of incidence is 39° or greater.

Below in Table 1 is a list of some of the materials that may be employed to form light guides suitable for use in portable electronic devices, and their corresponding indices of refraction.

TABLE 1

Indices of Refraction for Some Materials

| Material | Index of Refraction |
|---|---|
| Vacuum | 1 (exactly) |
| Air | 1.000293 |
| Water | 1.333 |
| Water ice | 1.31 |
| Acrylic glass | 1.490-1.492 |
| PMMA | 1.4893-1.4899 |
| Polycarbonate | 1.584-1.586 |

One objective is to provide a light guide capable of gathering light from a wider light collecting angle and thereby optimize light collection from the ambient environment for subsequent delivery to an ambient light sensor. As explained in further detail below, this objective is met in part by selectively employing total internal reflection ("TIR") in a light guide.

FIG. 3 shows prior art light guide 30 mounted in housing or case 80 of a portable electronic device such as a mobile telephone, PDA or computer. Ambient light 20 incident on substantially planar horizontal top surface 31 of light guide 30 is transmitted downwardly through first portion 32 of light guide 30, and then through second portion 33 of light guide 30, to emerge from lowermost portion 34 of light guide 30 for incidence on ambient light sensor 40, which is mounted on printed circuit board or other suitable substrate 50. Note that not all light incident on substantially planar horizontal top surface 31 will be collected by light guide 30 for delivery to ambient light sensor 40. Instead, some light will be scattered or diffracted, some light will be reflected away from light guide 30, and some light will otherwise be lost to collection and not delivered to light sensor 40.

Some typical dimensions of light guide 30 and ambient light sensor 40 are shown in FIG. 4, where the first outer diameter $d_1$ of first portion 32 is about 2.5 mm and defines first substantially vertical sidewalls 35, the second outer diameter $d_2$ of second portion 33 is about 1.5 mm and defines second substantially vertical sidewalls 36, the total height $y_1$ of first and second portions 32 and 33 of light guide 30 is about 2.5 mm, the height $y_2$ of second portion 33 of light guide 30 is about 1.5 mm, and the width and length $x_1$ of ambient light sensor 40 are each about 1 mm. The distance or gap $y_3$ between lowermost portion 34 of light guide 30 and ambient light sensor 40 was chosen to vary between about 0.2 mm and about 0.5 mm. FIG. 5 shows a bottom perspective view of prior art light guide 30, hereafter referred to as Design 1.

Figure 6:
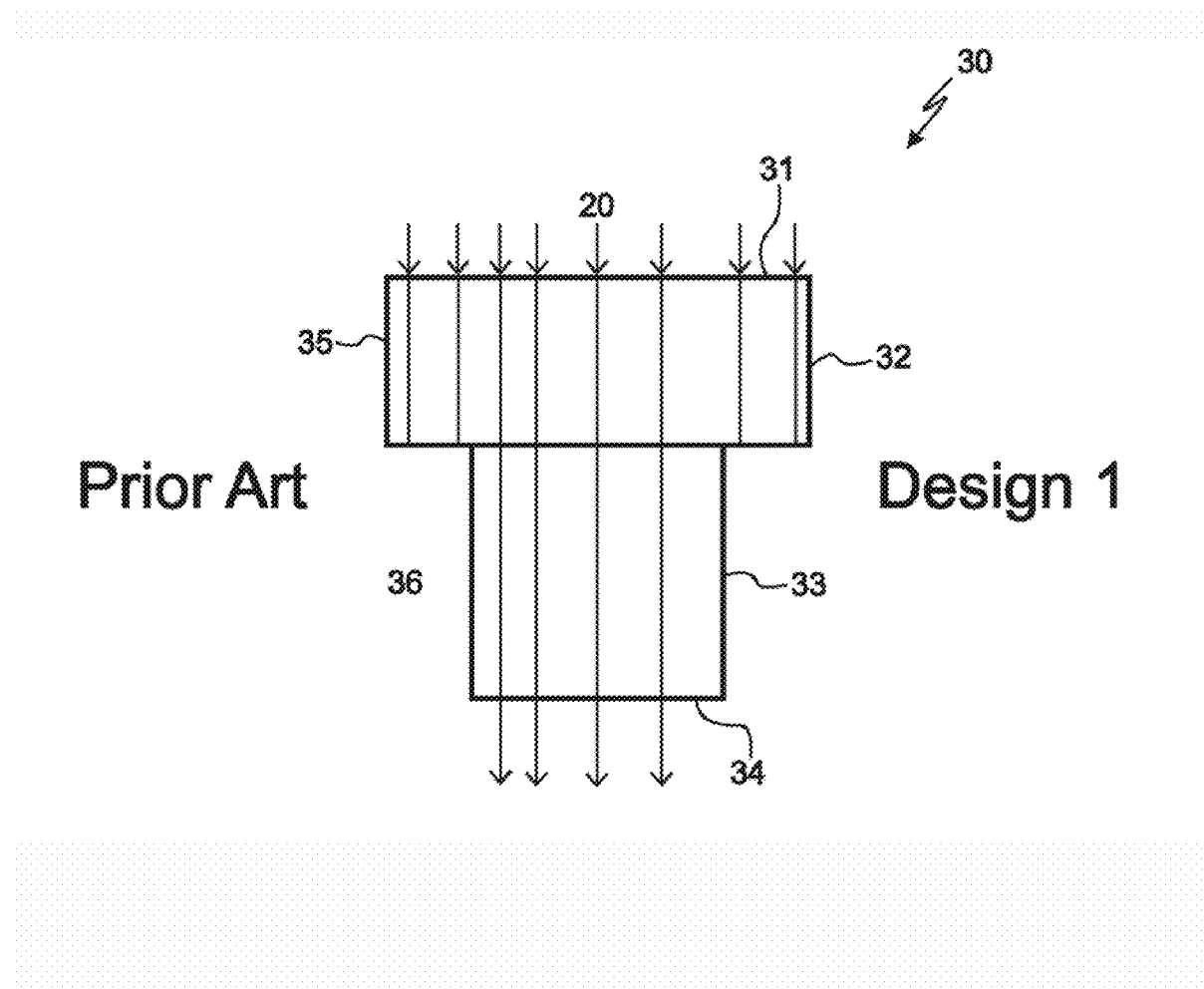
FIG. 6 shows ray tracing results for the prior art light guide of FIGS. 3, 4 and 5 corresponding to Design 1.
Figure 13:
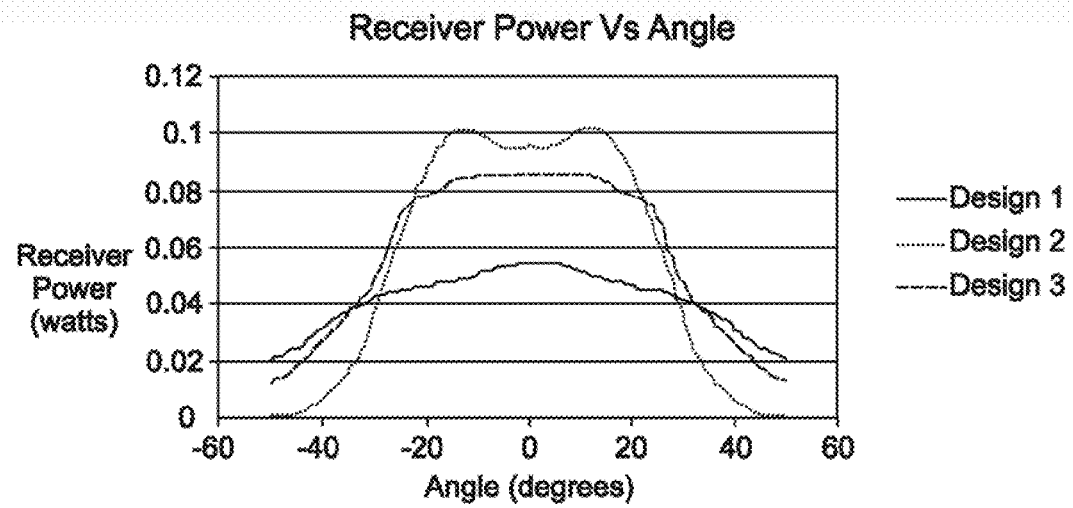
FIG. 13 shows the variation of output power in Watts versus angle of incidence for the prior art light guide shown in FIGS. 3-5, the first embodiment of a light guide shown in FIGS. 7-9, and the second embodiment of a light guide shown in FIGS. 10-12.

Using the foregoing dimensional and index of refraction information for polycarbonate (1.585), computational ray tracing of light guide design 1 was undertaken to evaluate the total flux or light power that falls onto ambient light sensor 40, assuming ambient light sensor 40 has an area of about 1 mm². An optical light guide model for Design 1 was then calculated using ZEMAX™ optical ray tracing software. See FIG. 6, where ambient incident light rays 20 incident on light guide 30 are shown, as are the transmitted and refracted light rays corresponding thereto. Using ZEMAX software, a "Universal Plot" of total light flux falling onto detector 40 versus the tilt angle of an external light source was also generated for Design 1 (see FIG. 13). FIG. 13 shows that Design 1 features a relatively smooth output power curve with respect to ambient light angles of incidence. Predictably, output power drops as angles of incidence become ever less vertical.

Figure 7:
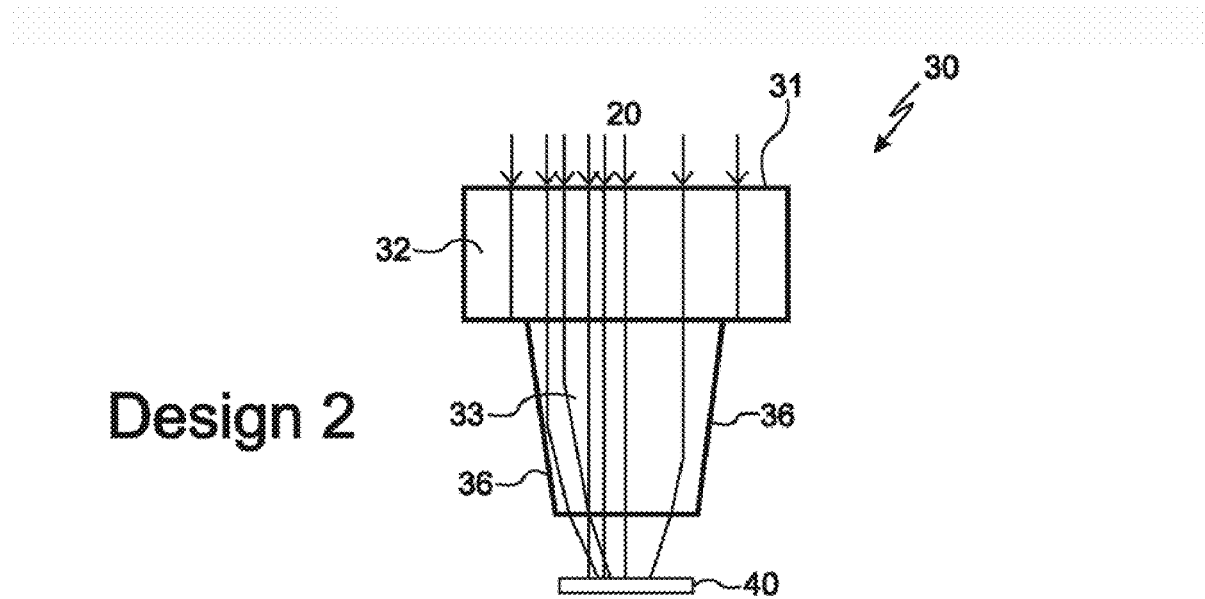
FIG. 7 shows ray tracing results for a light guide corresponding to a first embodiment (Design 2)
Figures 8, 9:
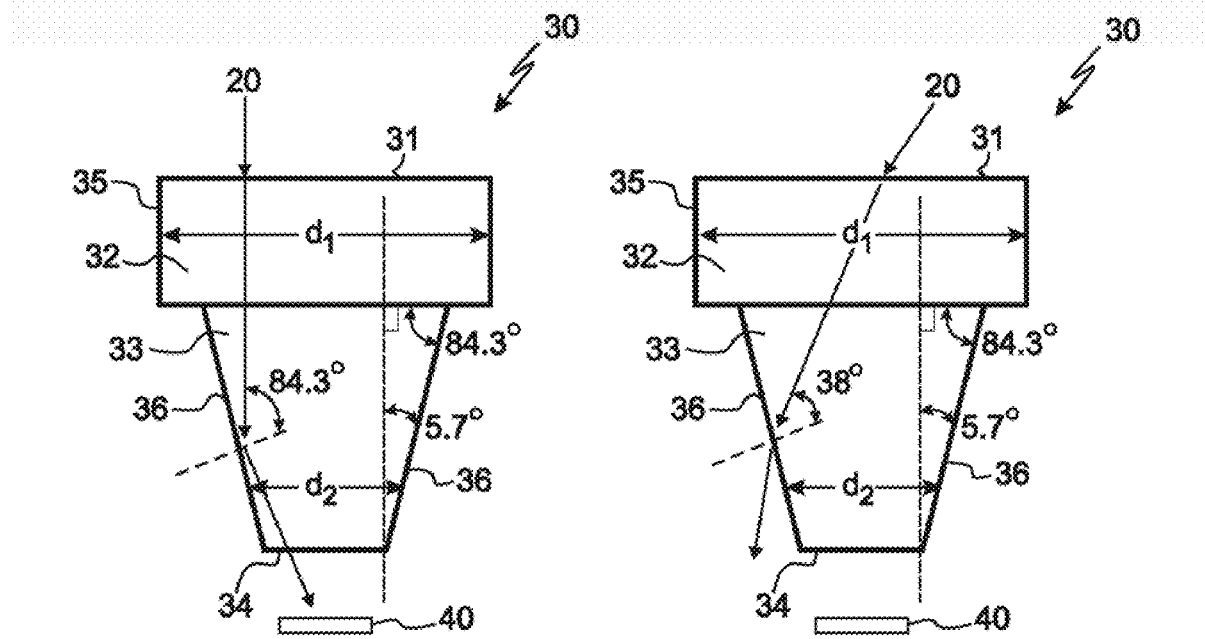
FIG. 8 shows total internal reflection results for the light guide corresponding to the first embodiment for vertically-incident light rays.
FIG. 9 shows total internal reflection results for the light guide corresponding to the first embodiment for non-vertically-incident light rays.

Referring now to FIGS. 7 through 9, there is shown Design 2 of light guide 30, where it will be seen that first portion 32 of light guide 30 is substantially the same as that of Design 2, where first sidewalls 35 are substantially vertical and defined by first outer diameter $d_1$, while second portion 33 features sloping non-vertical second sidewalls 36 having varying outer diameter $d_2$. The dimensions of Design 2 are similar to those of Design 1 except for diameter $d_2$ of second sidewalls 36 of second portion 33, which at lowermost portion 34 is about 1.2 mm, and which increases in linear fashion upwardly towards first portion 32 at an angle of 5.7 degrees with respect to the vertical (as shown in FIGS. 7 through 9).

FIG. 7 shows ray tracing results from the ZEMAX program for Design 2. FIG. 8 shows total internal reflection for a vertical incident light ray results in TIR for Design 2. FIG. 9 shows how a non-vertical light ray may result in non-TIR for Design 2. The angle of second sidewalls 36 in Design 2 was calculated on the basis of an index of refraction for polycarbonate so as to yield total internal reflection ("TIR") under certain circumstances, where the critical angle ($\phi_c$) was calculated to be 39°. For a vertically-incident ray (with an incident angle greater than 84.3°, which is greater than $\phi_c$, which is 39°), TIR will occur (as shown in FIG. 8). This helps to direct the ray path to light sensor 40, which in turn increases the output power and sensitivity of light sensor 40. As the angle of incidence of the incident ray become less vertical, however, and in particular when the angle of incidence become less than the critical angle (39°), TIR does not occur, and the ray will refract into an the adjoining medium as shown in FIG. 9, thereby illustrating the drawbacks of Design 2 with respect to the efficient collection of ambient light incident thereon. Referring now to FIG. 13, while the light guide of Design 2 does indeed enhance the collection of vertically-incident light rays for delivery to ambient light sensor 40, Design 2 also suffers from a rather dramatic fall-off of light collection at angles of incidence exceeding about 18 degrees. This means that the output power of ambient light sensor 40 drops off significantly as ambient light angles of incidence become ever less vertical.

Figure 10:
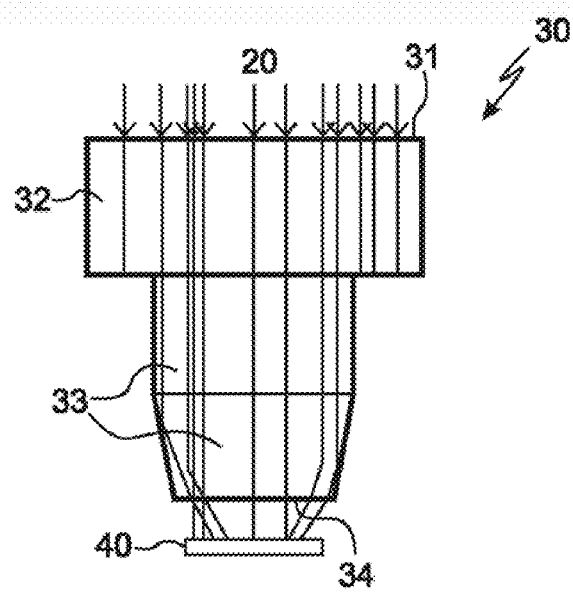
FIG. 10 shows ray tracing results for a light guide corresponding to a second embodiment (Design 3)
Figures 11, 12:
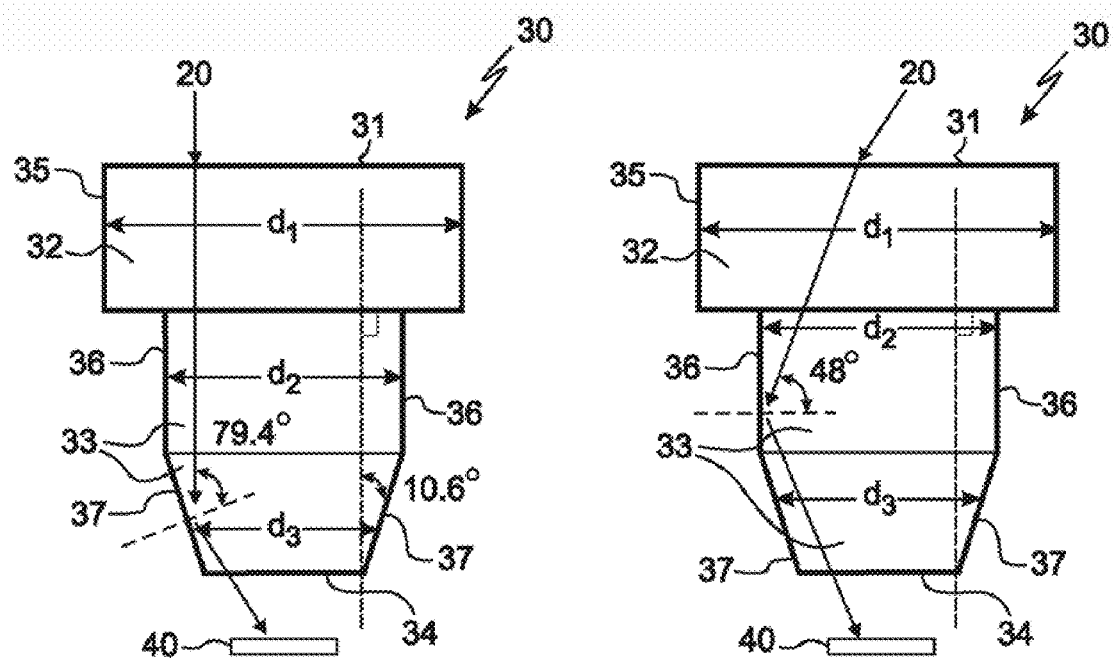
FIG. 11 shows total internal reflection results for the light guide corresponding to the second embodiment for vertically-incident light rays.
FIG. 12 shows total internal reflection results for the light guide corresponding to the second embodiment for non-vertically-incident light rays.

Referring now to FIGS. 10 through 12, there is shown Design 3 of light guide 30, where it will be seen that first portion 32 of light guide 30 is substantially the same as that of Design 2, where first sidewalls 35 are substantially vertical and defined by first outer diameter $d_1$, while second portion 33 features compound sidewalls 36 and 37 having diameters $d_2$ and $d_3$. Sidewalls 36 are substantially vertical and defined by second outer diameter $d_2$, while sidewalls 37 are sloping, non-vertical and have varying outer diameter $d_3$. The dimensions of Design 3 are similar to those of Designs 1 and 2 except for diameters $d_2$ and $d_3$ of second and third sidewalls 36 and 37 of second portion 33, which at lowermost portion 34 is about 1.3 mm, and which increases in linear fashion upwardly towards second outer diameter $d_2$ at an angle of 10.6 degrees with respect to the vertical (as shown in FIGS. 10 through 12).

FIG. 10 shows ray tracing results from the ZEMAX program for Design 3. FIG. 11 shows total internal reflection for a vertical incident light ray results in TIR for Design 3. FIG. 12 shows how a non-vertical light ray results in TIR for Design 3. The angle of third sidewalls 37 in Design 2 was calculated on the basis of an index of refraction for polycarbonate so as to yield total internal reflection ("TIR") under certain circumstances, where the critical angle ($\phi_c$) was calculated to be 39°. For a vertically-incident ray (with an incident angle greater than 79.4°, which is greater than $\phi_c$, which is 39°), TIR will occur (as shown in FIGS. 11 and 12). This helps to direct the ray path to light sensor 40, which in turn increases the output power and sensitivity of light sensor 40. Referring now to FIG. 13, it will be seen that the light guide of Design 3 does indeed enhance the collection of vertically-incident light rays for delivery to ambient light sensor 40, and also does a good job of collecting relatively high-amplitude non-vertically-incident light rays over a wide range of angles. This means that Design 3 of light guide 30, in conjunction with ambient light sensor 40, provides output power that does not drop off significantly as angles of incidence of the ambient light become ever less vertical.

A preferred material for forming light guide 30 is LEXAN™ polycarbonate, which is an amorphous engineering thermoplastic that combines high levels of mechanical, optical, electrical and thermal properties. This combination of physical properties makes it one of the toughest, most versatile of all engineering thermoplastics available. The refractive index of polycarbonate ranges between about 1.584 and about 1.586.

A typical range for processing unreinforced LEXAN™ grades ranges between about 160° F. and about 200° F. (71 to 93° C.), which helps give the surface a very smooth, glossy appearance. The aesthetic appeal of surfaces molded in reinforced LEXAN™ resin can be enhanced by the use of fast fill rates, higher injection pressures and mold temperatures in the 180° F. to 240° F. (82 to 116° C.) range. Actual injection pressures will depend on variables such as melt temperature, mold temperature, part geometry, wall thickness, flow length, and other mold and equipment considerations. Generally, the lowest pressures which provide the desired properties, appearance and molding cycle are preferred. Holding pressures from 60 to 80% of the injection pressure (−50 to 100 psi) are generally adequate for normal requirements.

Figure 14:
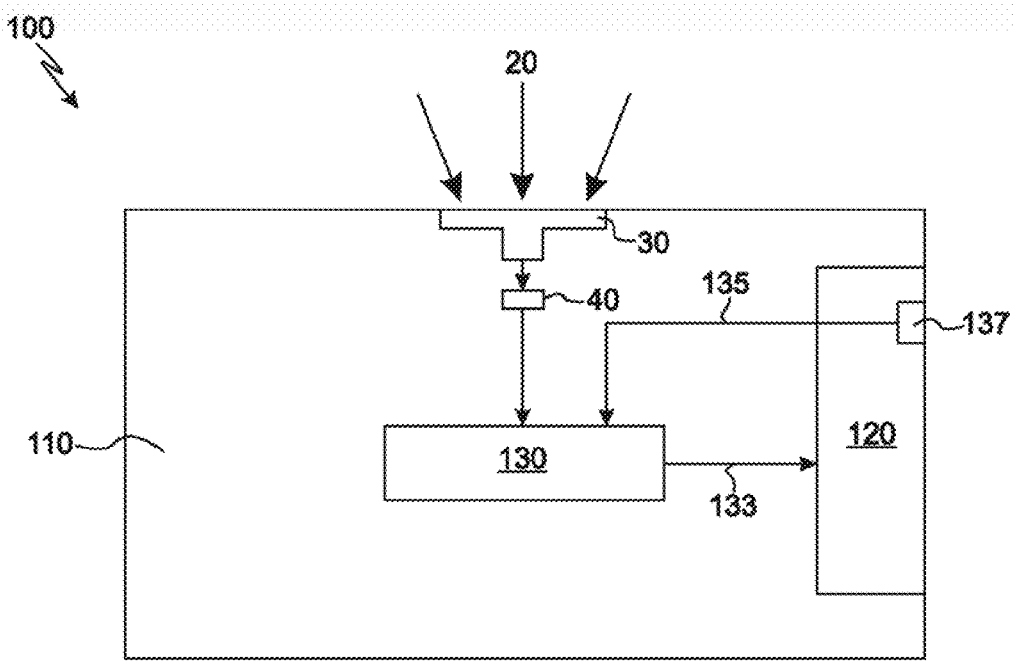
FIG. 14 illustrates one embodiment of alight sensing and backlit display feedback control system.

Referring now to FIG. 14, there is shown one embodiment of a light sensing and backlit display control system 100 comprising portable electronic device 110, which includes light guide 30 and ambient light sensor 40 operably associated with light guide 30 and disposed therebeneath. Ambient light sensor 40 is configured to receive the ambient light collimated by and transmitted through light guide 30, and to generate an output signal representative of an intensity of the ambient light that is sensed thereby. In turn, Ambient light sensor 40 is operably associated with backlit display 120 and computing device 130. Computing device 130 is a microprocessor, processor, CPU, controller, or other type of computing device which will now become apparent to those skilled in the art which is configured to receive the output signal from ambient light sensor 40 and determine whether backlighting for backlit display 120 should be increased or decreased based on the sensed intensity of the ambient light. Computing device 130 is operably associated with the backlit display and/or backlit feedback light sensor 137. Computing device may be configured to determine whether or not to activate backlighting of display 120 based on the sensed ambient light intensity and/or the amount or degree of backlighting illumination that is being generated by a backlighting illumination portion of backlit display 120, and further to substantially continuously adjust an amount of backlighting provided to display 130 as the sensed ambient light intensity changes and/or as the amount or degree of backlighting illumination that is being generated by a backlighting illumination portion of backlit display 120 changes. It is further contemplated that the amount of backlighting provided to display 130 as the sensed ambient light intensity changes and/or as the amount or degree of backlighting illumination be minimized or turned off when the sensed ambient light intensity is greater than a predetermined amount. It is also contemplated that the amount or degree of backlighting illumination be employed to cause the amount of backlighting provided to display 120 to be increased or turned on when the sensed ambient light intensity is less than a predetermined amount. Other variations in feedback control of the amount or degree of backlighting provided to display 120 are also contemplated.

Included within the scope of the present invention are methods of making and having made the various components, devices and systems described herein.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

I claim:

1. A light guide for a portable electronic device comprising top and bottom portions formed of an optically transmissive material, the top portion comprising a substantially planar horizontal top surface and having a first outer diameter defining first substantially vertical sidewalls, the bottom portion being contiguous with and attached to the top portion such that at least some ambient light incident on the top surface is transmitted through the top portion into the bottom portion, the bottom portion having upper and lower outer diameters that are less than the first outer diameter, the upper outer diameter defining second substantially vertical sidewalls depending downwardly from the top portion, the lower outer diameters defining third sloping sidewalls that decrease in diameter downwardly between the upper outer diameter and a lowermost minimum diameter, the sloping sidewalls having an angle with respect to vertical sufficient to cause total internal reflection of ambient light transmitted through the top portion, reflected from the first sidewalls, and that subsequently becomes incident on the third sloping sidewalls.

2. The light guide of claim 1, wherein the angle exceeds about ten degrees.

3. The light guide of claim 1, wherein the angle is about 10.6 degrees.

4. The light guide of claim 1, wherein an angle of incidence on the third sloping sidewalls of ambient light transmitted through the top portion, reflected from the first sidewalls, and subsequently incident on the third sloping sidewalls exceeds about 38 degrees.

5. The light guide of claim 1, wherein the light guide comprises polycarbonate, Poly(methyl methacrylate) ("PMMA"), a polymer, a combination of polymers, plastic, acrylic, acrylic glass, or glass.

6. The light guide of claim 1, wherein the optically transmissive material has an index of refraction exceeding about 1.4.

7. The light guide of claim 1, wherein the optically transmissive material has an index of refraction exceeding about 1.5.

8. The light guide of claim 1, wherein the first diameter ranges between about 2 mm and about 3 mm.

9. The light guide of claim 1, wherein the upper diameter ranges between about 1 mm and about 2 mm.

10. The light guide of claim 1, wherein the lower diameters are less than about 1.5 mm.

11. A portable electronic device, comprising:
a light guide comprising top and bottom portions formed of an optically transmissive material, the top portion comprising a substantially planar horizontal top surface and having a first outer diameter defining first substantially vertical sidewalls, the bottom portion being contiguous with and attached to the top portion such that at least some vertically-oriented ambient light incident on the top surface is transmitted through the top portion into the bottom portion, the bottom portion having upper and lower outer diameters that are less than the first outer diameter, the upper outer diameter defining second substantially vertical sidewalls depending downwardly from the top portion, the lower outer diameters defining third sloping sidewalls that decrease in diameter downwardly between the upper outer diameter and a lowermost minimum diameter, the sloping sidewalls having an angle with respect to vertical sufficient to cause total internal reflection of ambient light transmitted through the top portion, reflected from the first sidewalls, and that subsequently becomes incident on the third sloping sidewalls;
an ambient light sensor operably associated with the light guide and disposed therebeneath, the ambient light sensor being configured to receive the ambient light collimated by and transmitted through the light guide, the ambient light sensor further being configured to generate an output signal representative of an intensity of the ambient light that is sensed thereby;
a backlit display, and
a computing device configured to receive the output signal and determine whether backlighting for the backlit display should be increased or decreased based on the sensed intensity of the ambient light, the computing device being operably associated with the backlit display.

12. The portable electronic device of claim 11, wherein the computing device further determines whether or not to activate backlighting of the display based on the sensed ambient light intensity.

13. The portable electronic device of claim 11, wherein the computing device substantially continuously adjusts an amount of backlighting provided to the display as the sensed ambient light intensity changes.

14. The portable electronic device of claim 11, wherein the computing device causes the amount of backlighting provided to the display to be minimized or turned off when the sensed ambient light intensity is greater than a predetermined amount.

15. The portable electronic device of claim 11, wherein the computing device causes the amount of backlighting provided to the display to be increased or turned on when the sensed ambient light intensity is less than a predetermined amount.

16. The portable electronic device of claim 11, wherein the ambient light sensor is spaced apart from the lowermost minimum diameter of the light guide by between about 0.2 mm and about 0.5 mm.

17. The portable electronic device of claim 11, wherein the angle exceeds about ten degrees.

18. The portable electronic device of claim 11, wherein the angle is about 10.6 degrees.

19. The portable electronic device of claim 11, wherein an angle of incidence on the third sloping sidewalls of light rays transmitted through the top portion, reflected from the first sidewalls, and subsequently incident on the third sloping sidewalls exceeds about 38 degrees.

20. The portable electronic device of claim 11, wherein the light guide comprises polycarbonate, Poly(methyl methacrylate) ("PMMA"), a polymer, a combination of polymers, plastic, acrylic, acrylic glass, or glass.

21. The portable electronic device of claim 11, wherein the optically transmissive material has an index of refraction exceeding about 1.4.

22. The portable electronic device of claim 11, wherein the optically transmissive material has an index of refraction exceeding about 1.5.

23. The portable electronic device of claim 11, wherein the first diameter ranges between about 2 mm and about 3 mm.

24. The portable electronic device of claim 11, wherein the upper diameter ranges between about 1 mm and about 2 mm.

25. The portable electronic device of claim 11, wherein the lower diameters are less than about 1.5 mm.

26. The portable electronic device of claim 11, wherein the portable electronic device is a mobile phone, a personal data assistance (PDA), a laptop computer, or a notebook computer.

27. A light guide for a portable electronic device comprising top and bottom portions formed of an optically transmissive material, the top portion comprising a substantially planar horizontal top surface and having a first outer diameter defining first substantially vertical sidewalls, the bottom portion being contiguous with and attached to the top portion such that at least some ambient light incident on the top surface is transmitted through the top portion into the bottom portion, the bottom portion having diameters that are less than the first outer diameter, the diameters of the lower portion defining sloping sidewalls that decrease in diameter downwardly between the top portion and a lowermost minimum diameter, the sloping sidewalls having an angle with respect to vertical sufficient to cause total internal reflection of ambient light transmitted through the top portion, reflected from the first sidewalls, and that subsequently becomes incident on the sloping sidewalls.

28. The light guide of claim 26, wherein the angle exceeds about ten degrees.

29. The light guide of claim 26, wherein an angle of incidence on the sloping sidewalls of ambient light transmitted through the top portion, reflected from the first sidewalls, and subsequently incident on the sloping sidewalls exceeds about 38 degrees.

30. The light guide of claim 26, wherein the light guide comprises polycarbonate, Poly(methyl methacrylate) ("PMMA"), a polymer, a combination of polymers, plastic, acrylic, acrylic glass, or glass.

31. The light guide of claim 26, wherein the optically transmissive material has an index of refraction exceeding about 1.4.

32. The light guide of claim 26, wherein the first diameter ranges between about 2 mm and about 3 mm.

33. The light guide of claim 26, wherein the diameters of the bottom portion range between about 1 mm and about 2 mm.

\* \* \* \* \*